United States Patent [19]
Ohtake

[11] Patent Number: 5,496,994
[45] Date of Patent: Mar. 5, 1996

[54] RANGE DETECTION OPTICAL SYSTEM WITH LIGHT EMITTER BEHIND PROJECTION LENS FOCAL POINT AND LIGHT RECEIVER BEHIND RECEIVING LENS FOCAL POINT

[75] Inventor: Motoyuki Ohtake, Ohmiya, Japan

[73] Assignee: Nikon Corporation, Tokyo, Japan

[21] Appl. No.: 296,888

[22] Filed: Aug. 29, 1994

[30] Foreign Application Priority Data

Aug. 27, 1993 [JP] Japan .................................. 5-235501

[51] Int. Cl.$^6$ ................ G02B 7/04; G01C 3/08
[52] U.S. Cl. ...................... 250/201.6; 356/4.01
[58] Field of Search ............. 250/201.6, 201.4; 356/1, 4, 4.01, 4.05

[56] References Cited

U.S. PATENT DOCUMENTS

| | | | |
|---|---|---|---|
| 3,393,321 | 7/1968 | Früngel | 356/4 |
| 3,489,495 | 3/1969 | Blau et al. | 356/4 |
| 4,567,347 | 1/1986 | Ito et al. | 356/1 |
| 4,970,384 | 11/1990 | Kambe et al. | 250/201.6 |
| 5,361,118 | 11/1994 | Taka et al. | 250/201.4 |

FOREIGN PATENT DOCUMENTS

| | | |
|---|---|---|
| 55-88001 | 7/1980 | Japan . |
| 1-158409 | 6/1989 | Japan . |

*Primary Examiner*—Edward P. Westin
*Assistant Examiner*—Jacqueline M. Steady
*Attorney, Agent, or Firm*—Staas & Halsey

[57] ABSTRACT

Provided is an active range detection optical system which can measure a distance with high accuracy independent of the position of an object over the far-to-near range. The range detection optical system is provided with a light projection system for projecting a beam emitted from a light emission source through a light projection lens onto the object, and a light receiving system for condensing a reflection beam from the object through a light receiving lens onto a light receiving element, in which the optical axis of the light projection system and the optical axis of the light receiving system are positioned as separate a predetermined distance from each other, which is for measuring a distance between a predetermined position and the object, based on an output signal from the light receiving element, and which is characterized in that a position of the light-source-side focal point of the light projection lens is located between a surface closest to the light source, of the light projection lens and the light emission source.

12 Claims, 2 Drawing Sheets

RANGE DETECTION OPTICAL SYSTEM WITH LIGHT EMITTER BEHIND PROJECTION LENS FOCAL POINT AND LIGHT RECEIVER BEHIND RECEIVING LENS FOCAL POINT

BACKGROUND OF THE INVENTION

1. Field of the Invention

The present invention relates to a range detection optical system used in photographic cameras, cinematographic cameras, video cameras, etc.

2. Related Background Art

Active distance-measuring optical systems employ the theory of triangulation. Namely, an optical system of such a type is provided with a light projection system and a light receiving system the optical axes of which are separated at a predetermined distance (base length) from each other, as being so arranged that the light projection system projects an infrared beam toward an object and the light receiving system receives a reflection beam returning from the object. The optical system employs a method for measuring a distance between a predetermined position and the object (hereinafter referred to as "range detection"), based on an amount of deviation along the direction of the base length between the optical axis of the light receiving system and a position where the reflection beam impinges on a photodetector in the light receiving system. The active method is excellent in that the range detection can be made independent of the contrast of the object.

The conventional active range detection optical systems, however, had a problem that object-side numerical apertures of a light receiving lens for the object in a far range were smaller than those for the object in a near range. This resulted in decreasing a quantity of light received by the light receiving system, which could in turn cause an error in range detection.

If the object is in a far range an enlarged image of a light emission source is projected onto the object. Thus, a defocus amount was great in the far range, and the projected image was larger than the object. This caused the light receiving system to fail to receive most of the projected light except part, which could cause an error in range detection.

As described, the conventional active range detection optical systems had lower accuracy of range detection for far objects. Japanese Patent Application Laid-open No. 55-88001 discloses an aberration correction method for light projection lens and light receiving lens, solving the above problem to some extent and improving the range detection accuracy.

Further, Japanese Patent Application Laid-open No. 1-158409 discloses a range detection optical system in which each of the light projection lens and the light receiving lens is composed of two lenses to correct the image plane.

In the range detection optical system as disclosed in the Japanese Patent Application Laid-open No. 55-88001, the light projection system is so arranged that the light emission source is located at the light-source-side focal point of the light projection lens, and, therefore, the image of the light source through the light projection lens is at infinity. This arrangement can lower the defocus amount of the projected image if the object is located considerably far away from the light projection lens. Conversely, if the object is located near the light projection lens, the defocus amount of the projected image increases so as to lower the range detection accuracy down to an insufficient level, which has been inconvenient.

In the light receiving system the photodetector is located at the detector-side focal point of the light receiving lens. If the object is in a near range, the position of an image of the object through the light receiving lens greatly deviates from the photodetector, so as to blur the image on the photodetector, which could inconveniently cause an error in range detection.

Further, since the range detection optical system as disclosed in Japanese Patent Application Laid-open No. 1-158409 is so arranged that each of the light projection lens and the light receiving lens is composed of two lenses, a reduction of production cost would be difficult. Another problem was that the transmittance was degraded without an anti-reflection coat on lens surfaces.

SUMMARY OF THE INVENTION

The present invention has been accomplished under the above circumstances. It is, therefore, an object of the present invention to provide an active range detection optical system which can perform high-accuracy range detection over the far-to-near range independent of the position of the object.

The present invention is directed to a range detection optical system provided with a light projection system T for projecting a light beam emitted from a light emission source P through a light projection lens L1 onto an object H, and a light receiving system J for condensing a reflection beam from the object H through a light receiving lens L2 onto a light receiving element Q, in which the optical axis of the light projection system T is positioned at an interval of a predetermined distance to the optical axis of the light receiving system J, whereby a distance between a predetermined position and the object H is measured based on an output signal from the light receiving element Q. In the range detection optical system of the present invention, a position F1 of the light-source-side focal point of the light projection lens L1 is located between a surface closest to the light emission source, of the light projection lens L1, and the light emission source P.

In another aspect of the present invention, a range detection optical system is so arranged that a position F2 of the light receiving-element-side focal point of the light receiving lens L2 is located between a surface closest to the light receiving element, of the light receiving lens L2, and the light receiving element Q.

The following describes requirements for high-accuracy range detection over the far-to-near range independent of the object position with the so-called active range detection optical systems.

In case of the object H in the far range, object-side numerical apertures of the light receiving lens L2 in the light receiving system J are smaller than those in the near range. This results in decreasing a quantity of light incident into the light receiving lens L2, as returning from the object H by reflection among the light projected from the light projection system T toward the object H. Therefore, in order to improve the range detection accuracy (range detection performance) for the object H in the far range, it is necessary to increase the quantity of light projected from the light projection system T toward the object H, that is, to increase the aperture of the light projection lens L1, to increase the quantity of the emitted light, or to increase the aperture of the light receiving lens L2.

Also, a projected spot (image of the light emission source P projected onto the object H) is greatly enlarged if the object is in the far range. Thus, a defocus amount of the projected spot must be lowered in order to control the size of the spot projected from the light projection system T toward the object H.

Especially, when the projected spot largely spreads to become larger than the object H, only part of projected light returns to the light receiving system J. Then, a barycenter position of an image observed on the light receiving element Q in the light receiving system J becomes shifted from a barycenter position of an image to be obtained when all projected light is assumed to return to the light receiving system J, which could cause an error in range detection.

Conversely, if the object H is in the near range, the position of a paraxial image of the object H formed by the light projection system T deviates by a large deviation amount from the position of a paraxial image of an object at infinity, thus increasing the defocus amount of the projected spot onto the object. Similarly, in the light receiving system J the position of a paraxial image of the object H formed by the light receiving lens L2 largely deviates from the light receiving element Q, so that the beam returning from the object H is observed as blurred on the light receiving element Q.

Accordingly, it is necessary that the light projection lens L1 and the light receiving lens L2 each focus the image with a less defocus amount independent of the position of the object H. In particular, it is important to keep a change of the defocus amount as small as possible with a change of the object position.

Summarizing the above discussion, the following points are required as to the light projection lens L1: (i) to increase the aperture of the light projection lens L1; (ii) to lower the defocus amount of the projected spot onto the object H over the far range to the near range as much as possible.

Also, the following points are required as to the light receiving lens L2: (i) to increase the aperture of the light receiving lens L2; (ii) to focus the reflection beam returning from the object H on the light receiving element Q with a small defocus amount independent of the position of the object H.

In the present invention, satisfying the above requirements to perform the range detection with high accuracy over the far range to the near range independent of the position of the object H, the light emission source P is positioned in the light projection system T in such a manner that a position of an image of light emission source P formed by the light projection lens L1 is at a position R1 separated a predetermined finite distance away from the light projection lens L1, and the light receiving element Q is positioned in the light receiving system J in such a manner that a position of a paraxial image of light receiving element Q formed by the light receiving lens L2 is at a position R2 separated a predetermined finite distance away from the light receiving lens L2. Thus, the invention provides the range detection optical system which can perform range detection with high accuracy independent of the position of the object H, ranging from the infinity to the closest distance.

The range detection optical system of the present invention is so arranged that the position of the image of light emission source P formed by the light projection lens L1 is at the finite position R1 in the light projection system T. Thus, the defocus amount of the projected spot on the object H in the near range can be made smaller than those in the conventional light projection systems J. Accordingly, the range detection performance can be improved for the object H located in the near range.

Similarly, in the light receiving system J the light receiving element Q is positioned at the position where the image thereof is formed at the predetermined finite position R2 by the light receiving lens L2. For the object H located in the near range, this arrangement can make smaller the deviation amount of the position of the image of the object by the light receiving lens L2 with respect to the position of the light receiving element Q as compared with those in the conventional technology. Accordingly, the range-detection performance can be improved for the object H located in the near range.

For higher-accuracy range detection, it is preferred in the present invention that the position R1 of the image of light emission source P formed by the light projection lens L1 be made coincident with the position R2 where the image is formed on the light receiving element Q by the light receiving lens L2.

Further, the light projection lens L1 is preferably arranged to be aberration-corrected so as to have a positive spherical aberration, as shown in FIG. 2. Namely, arranging the light projection lens L1 in such a manner that light flux of rays passing through the central region near the optical axis AX1 of the light projection lens L1 is focused at the position of the predetermined distance R1 while light flux of rays passing through the peripheral region away from the optical axis AX1 of the light projection lens L1 is focused at positions becoming more distant from the light projection lens L1 than the position R1 as a passing point of ray becomes more distant from the optical axis, the defocus amount can also be made smaller for the object H in the far range, enabling to perform the range detection with high accuracy.

Moreover, not only does the correction into the positive spherical aberration widen the detection range, but it also increases the radius of curvature in the peripheral region of lens, whereby the edge thickness (the thickness of the peripheral portion of lens) can be decreased. In other words, the center of lens can be made thinner. This can reduce the time for forming the lens, which is advantageous in reducing the production cost. In addition, the defocus amount can be further decreased, because the focal length of the lens can be increased.

Incidentally, although transmitted rays by the light receiving lens L2 travel in the opposite direction to those by the light projection lens L1, it can be considered that the relation of the optical arrangement between the object H and the light emission source P is equivalent to that between the object H and the light receiving element Q. Accordingly, in the present invention the light receiving lens L2 is also arranged to satisfy the same optical requirements as the light projection lens L1 is. Namely, the light receiving lens L2 is so arranged that the further point from the optical axis on the light receiving lens L2 light flux which focuses on the light receiving element Q passes, the further point the light flux has passed from the light receiving lens on the optical axis.

In the present invention it is preferred that the following conditional equations (1) and (3) be satisfied in order to assure higher range detection accuracy.

$$0.85 < (f1 - Bf1')/(f1 - Bf1) < 1.0 \quad (1)$$

$$0.85 < (f2 - Bf2')/(f2 - Bf2) < 1.0 \quad (3)$$

In the above equations, f1: focal length of the light projection lens L1 on the light emission source side;

f2: focal length of the light receiving lens L2 on the light receiving element side;

Bf1: axial distance between a surface closest to the light emission source, of the light projection lens L1 and the position of the light-source-side focal point of the light projection lens L1;

Bf2: axial distance between a surface closest to the light receiving element, of the light receiving lens L2 and the position of the light receiving-element-side focal point of the light receiving lens L2;

Bf1': axial distance between the surface closest to the light emission source, of the light projection lens L1 and the light emission source P;

Bf2': axial distance between the surface closest to the light receiving element, of the light receiving lens L2 and the light receiving element Q.

The conditional equation (1) defines a relation on the optical arrangement between the light projection lens L1 and the light emission source P in the light projection system T.

Above the upper limit of the conditional equation (1), the position of the image of the light emission source P formed by the light projection lens L1 becomes too far from the light projection lens L1. Then, the defocus amount of the projected spot becomes larger for the object in the near range, which could cause an error in range detection.

Conversely, below the lower limit of the conditional equation (1), the position of the image of the light emission source P formed by the light projection lens L1 becomes too close to the light projection lens L1. Then, as the object is located more distant in the far range, the defocus amount of the projected spot increases, which could cause an error in range detection.

The conditional equation (3) defines a relation on the optical arrangement between the light receiving lens L2 and the light receiving element Q in the light receiving system J.

Above the upper limit of the conditional equation (3), the position of the object to be focused on the light receiving element Q becomes too far from the light receiving lens L2. Then the defocus amount on the light receiving element Q becomes too large for the object in the near range, which could undesirably cause an error in range detection.

Conversely, below the lower limit of the conditional equation (3), the position of the object to be focused on the light receiving element Q becomes too close to the light receiving lens L2. Then, the defocus amount on the light receiving element Q becomes too large as the object is located further in the far range, which could undesirably cause an error in range detection.

In the present invention it is preferred to further satisfy the following conditional equation (2) besides satisfying the conditional equation (1) in order to secure further higher range detection accuracy. Also, it is preferred to further satisfy the following conditional equation (4) besides satisfying the conditional equation (3).

$$0.1 < (R2T - R1T)/(R1T < 1.5 \quad (2)$$

$$0.1 < (R2J - R1K)/R1J < 1.5 \quad (4)$$

In the above equations,

R1T: axial distance between the position of the image of the light emission source P through the paraxial region of the light projection lens L1 and the surface closest to the object, of the light projection lens L1;

R2T: axial distance between a position where light flux passing at the height of a half of a maximum effective diameter h1 of the surface closest to the light source P, of the light projection lens L1 from the optical axis on the surface closest to the object, of the light projection lens L1 among the light flux emitted from the light emission source P is focused, and the surface closest to the object, of the light projection lens L1;

R1J: axial distance between the position of the image of the light receiving element Q through the paraxial region of the light receiving lens L2 and the surface closest to the object, of the light receiving lens L2;

R2J: axial distance between a position where light flux passing at the height of a half of a maximum effective diameter h2 of the surface closest to the object, of the light receiving lens L2 from the optical axis on the surface closest to the object, of the light receiving lens L2 among the light flux focused on the light receiving element Q has passed on the optical axis, and the surface closest to the object, of the light projection lens L1.

The conditional equation (2) defines a condition for decreasing the change in the defocus amount of the projected spot from the light projection system T onto the object H, for the position of the object H ranging from the near range to the far range.

Above the upper limit of the conditional equation (2), the defocus amount of the projected spot becomes too large for the object H in the near range, which could cause an error in range detection.

Conversely, below the lower limit of the conditional equation (2), the defocus amount of the projected spot becomes too large for the object H in the far range, which could cause an error in range detection.

The conditional equation (4) defines a condition for decreasing the change in the defocus amount on the light receiving element Q, of the reflection beam returning from the object H in the light receiving system J, for the position of the object H ranging from the near range to the far range.

Above the upper limit of the conditional equation (4), the beam returning onto the light receiving element Q is focused as widely spread when the object H is in the near range, which could undesirably cause an error in range detection.

Conversely, below the lower limit of the conditional equation (4), the beam returning onto the light receiving element Q is focused as widely spread when the object H is in the far range, which could undesirably cause an error in range detection.

DETAILED DESCRIPTION OF THE PREFERRED EMBODIMENTS

Embodiments of the present invention will be described referring to the accompanying drawings.

Figure 1:
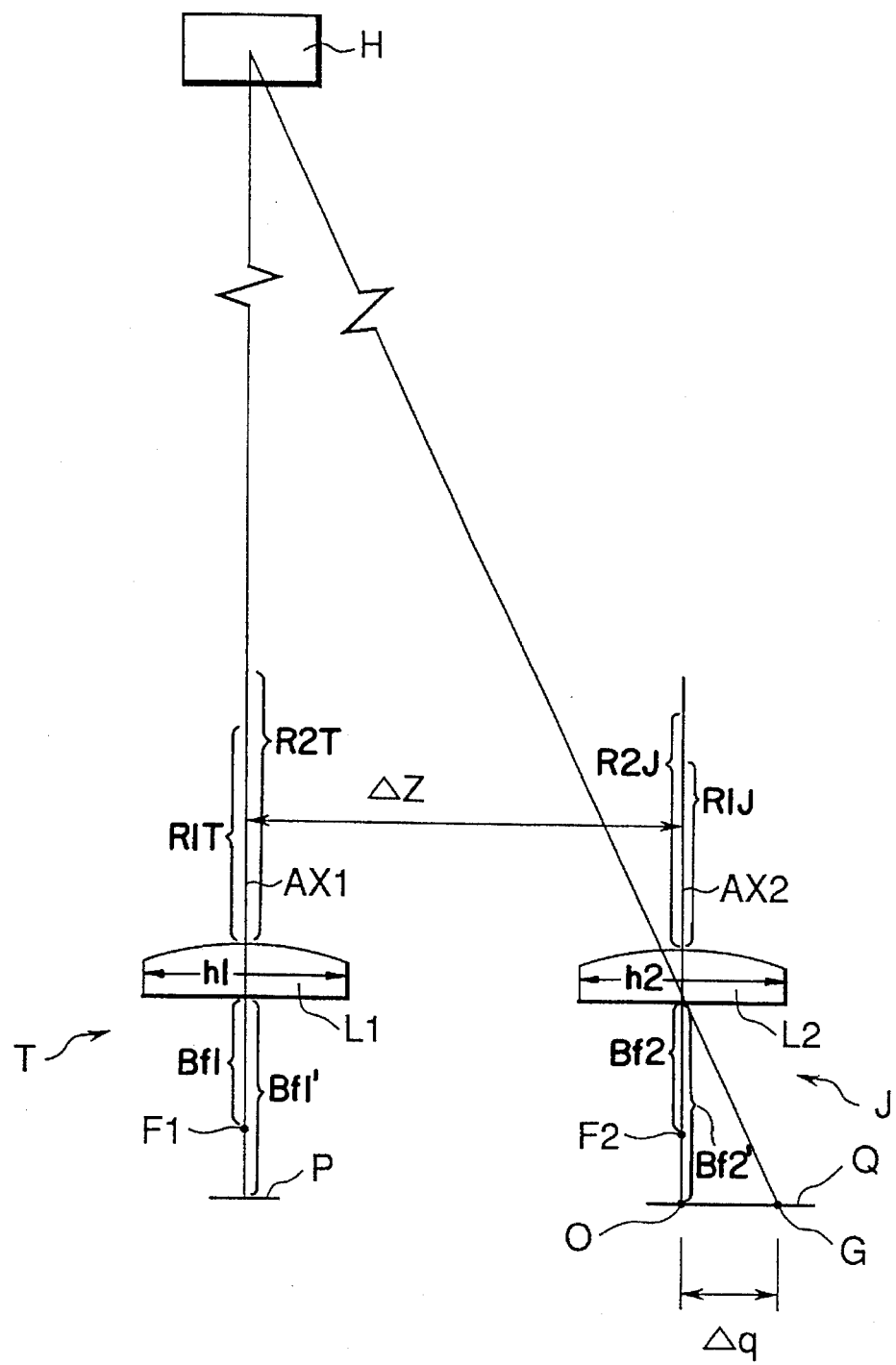
FIG. 1 is a drawing to diagrammatically show the structure of a range detection optical system of the present invention.
Figure 2:
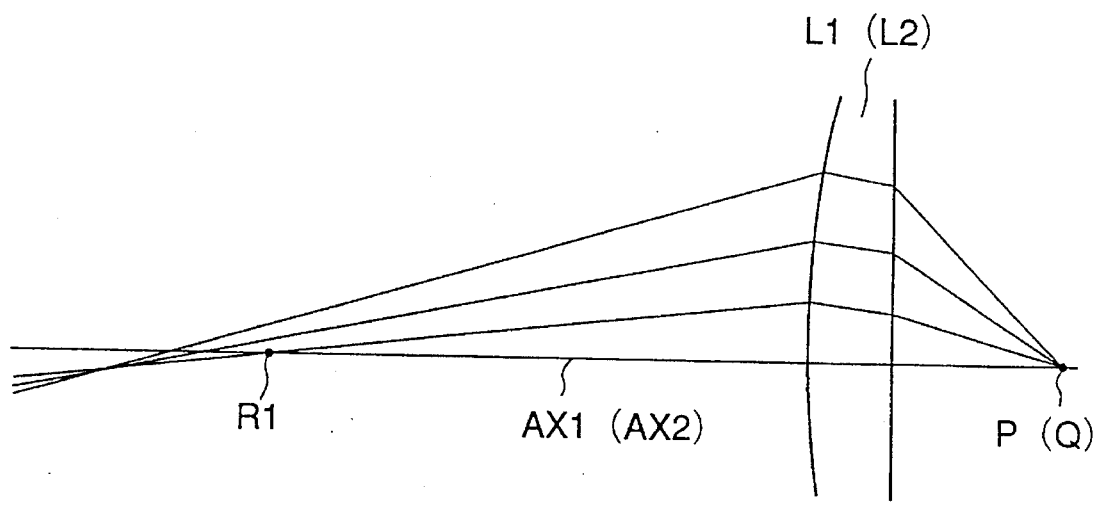
FIG. 2 is a drawing to illustrate aberration correction of a light projection lens in FIG. 1.

FIG. 1 is a drawing to diagrammatically show the structure of a range detection optical system as an embodiment of the present invention. The range detection optical system as shown is provided with a light projection system T composed of a light emission source P and a light projection lens L1 disposed on the optical axis AX1. The light emission source P is constructed of IRED (infrared-light-emitting diode) for emitting a beam of infrared rays, for example. A position F1 of a focal point on the light source P side, of the light projection lens L1 is positioned between a surface on the light source P side, of the light projection lens L1 and the light source P.

The range detection optical system as shown is also provided with a light receiving system J composed of a light receiving element Q and a light receiving lens L2 disposed on the optical axis AX2 parallel with and separate a predetermined distance ΔZ (base length) from the optical axis AX1. In the light receiving system J, a position F2 of a focal point on the light receiving element Q side, of the light receiving lens L2 is positioned between a surface on the light receiving element Q side, of the light receiving lens L2 and the light receiving element Q.

The following describes the operation of the range detection optical system in the present embodiment as so arranged.

An infrared beam emitted from the light emission source P is led through the light projection lens L1 to be condensed and projected toward an object H. A beam reflected by the object H is led through the light receiving lens L2 to be condensed and focused on the light receiving element Q as deviating from the optical axis AX2. A distance between a predetermined position and the object H is measured based on a distance Δq between a position O of the optical axis AX2 on the light receiving element Q and a position G of a barycenter of a focused spot.

EXAMPLE 1

In this example, the light emission source P is an IRED the emission wavelength of which is 860 nm, and the light receiving element Q is a PSD (position sensitive diode). Further, the base length ΔZ is 30 mm.

Table 1 shown below lists values of specifications for example 1 of the present invention. In Table 1, each of left end numbers represents the order of each lens surface counted from the object side, r a radius of curvature of each lens surface, d surface separation between lens surfaces, and n an index of refraction for the emission wavelength of the light emission source P. The unit of r and d is mm. For the light projection system T and the light receiving system J, the lens data along the traveling direction of the beam is indicated.

Aspherical surfaces are represented by the following mathematical formula (a):

$$S(y)=(y^2/R)/[1+(1-k \cdot y^2/R^2)^{1/2}] +C_2 \cdot y^2+C_4 \cdot y^4+C_6 \cdot y^6+C_8 \cdot y^8+ C_{10} \cdot y^{10}+\ldots \quad (a)$$

where y is the height in the direction normal to the optical axis, S(y) a displacement amount along the direction of the optical axis at the height y, R a radius of curvature of reference, k a conical coefficient, and Cn aspherical coefficients of the n-th order.

Also, a radius r of paraxial curvature of each aspherical surface is defined by the following mathematical formula (b).

$$r=1/(2 \cdot C_2+1/R) \quad (b)$$

In the table of specifications in each example, aspherical surfaces each are marked with an asterisk attached to the surface number on the right side.

TABLE 1

| (Light projection system) | | | |
|---|---|---|---|
| | r | d | n |
| 0 | ∞ | 2.17 | 1.54000 (radiative surface of IRED) |
| 1 | −1.3500 | 12.33 | (surface of plastic cover of IRED) |
| 2 | 95.5380 | 4.50 | 1.48423 (light projection lens) |
| 3* | −9.5991 | 4000.0 | |

| (Data of aspherical surface) | | | |
|---|---|---|---|
| 3rd surface | k 0.7664 | $C_2$ 0.0000 | $C_4$ 0.64823 × 10⁻⁶ |
| | $C_6$ 0.26688 × 10⁻⁸ | $C_8$ 0.36944 × 10⁻¹⁰ | $C_{10}$ 0.29195 × 10⁻¹² |

| (Light receiving system) | | | |
|---|---|---|---|
| | r | d | n |
| 0 | ∞ | 4000.0 | (reference object surface) |
| 1* | 8.2925 | 4.50 | 1.48423 (light receiving lens) |
| 2 | −139.0400 | 13.80 | |

| (Data of aspherical surface) | | | |
|---|---|---|---|
| 1st surface | k 0.5612 | $C_2$ 0.0000 | $C_4$ −0.43029 × 10⁻⁶ |
| | $C_6$ −0.11284 × 10⁻⁸ | $C_8$ −0.65264 × 10⁻¹⁰ | $C_{10}$ 0.72888 × 10⁻¹³ |

| (Values for the conditions) |
|---|
| f1 = 18.2687 |
| Bf1' = 15.5592 |
| Bf1 = 15.4746 |
| Max effective diameter of 2nd surface 7.5 mm |
| f2 = 16.3288 |
| Bf2' = 13.5000 |
| Bf2 = 13.4339 |
| Max effective diameter of 1st surface 7.5 mm |
| (1) (f1 − Bf1')/(f1 − Bf1) = 0.970 |
| (2) (R2T − R1T)/R1T = 0.395 |
| (3) (f2 − Bf2')/(f2 − Bf2) = 0.977 |
| (4) (R2J − R1J)/R1J = 0.285 |

EXAMPLE 2

In this example, the light emission source P is an IRED the emission wavelength of which is 860 nm, and the light receiving element Q is a PSD (position sensitive diode). Further, the base length ΔZ is 28 mm.

As seen, the range detection optical system in example 2 is constructed substantially in the same arrangement as that in example 1 except for the base length and the lens data.

Table 2 shown below lists values of specifications in example 2 of the present invention. In Table 2, each of left end numbers represents the order of each lens surface counted from the object side, r a radius of curvature of each lens surface, d surface separation between lens surfaces, and n an index of refraction for the emission wavelength of the light emission source P. For the light projection system T and the light receiving system J, the lens data along the traveling direction of the beam is indicated.

TABLE 2

(Light projection system)

| | r | d | n | |
|---|---|---|---|---|
| 0 | ∞ | 12.90 | | (radiative surface of IRED) |
| 1 | 559.9000 | 4.00 | 1.48423 | (light projection lens) |
| 2* | −7.5922 | 4000.00 | | |

(Data of aspherical surface)

| | k | $C_2$ | $C_4$ |
|---|---|---|---|
| 2nd surface | 0.6662 | 0.0000 | $0.78781 \times 10^{-6}$ |
| | $C_6$ | $C_8$ | $C_{10}$ |
| | $0.52652 \times 10^{-8}$ | $0.13717 \times 10^{-10}$ | $0.24369 \times 10^{-11}$ |

(Light receiving system)

| | r | d | n | |
|---|---|---|---|---|
| 0 | ∞ | 4000.00 | | (reference object surface) |
| 1* | 7.5922 | 4.00 | 1.48423 | (light receiving lens) |
| 2 | −559.9000 | 12.90 | | |

(Data of aspherical surface)

| | k | $C_2$ | $C_4$ |
|---|---|---|---|
| 1st surface | 0.6662 | 0.0000 | $-0.78781 \times 10^{-6}$ |
| | $C_6$ | $C_8$ | $C_{10}$ |
| | $-0.52652 \times 10^{-8}$ | $-0.13717 \times 10^{-10}$ | $-0.24369 \times 10^{-11}$ |

(Values for the conditions)

f1 = 15.5049
Bf1' = 12.9000
Bf1' = 12.8398
Max effective diameter of 2nd surface 6.5 mm f2 = 15.5049
Bf2' = 12.9000
Bf2' = 12.8398
Max effective diameter of 1st surface 6.5 mm

| | |
|---|---|
| (1) (f1 − Bf1')/(f1 − Bf1) = | 0.977 |
| (2) (R2T − R1T)/R1T = | 1.0 |
| (3) (f2 − Bf2')/(f2 − Bf2) = | 0.977 |
| (4) (R2J − R1J)/R1J = | 1.0 |

It was verified that the range detection optical systems constructed as described above could perform the range detection with high accuracy.

Although the above-described examples were so arranged that each of the light projection lens and the light receiving lens was constructed of a single lens, it is apparent that each of them can be constructed of a plurality of lenses.

As described above, the present invention can provide the active range detection optical systems which can perform range detection with high accuracy independent of the object position, ranging from the far range to the near range.

What is claimed is:

1. A range detection optical system, for detecting a range of an object, comprising:
    a light projection system for projecting light flux onto the object, including
        a light emission source emitting the light flux, and
        a light projection lens disposed to receive the light flux from said light emission source and direct the light flux along an optical axis of said light projection system and onto the object, said light projection lens having a focal point between said light emission source and a surface of said light projection lens closest to said light emission source; and
    a light receiving optical system for condensing reflected light flux from the object and measuring a range to the object from said range detection optical system, including
        a light receiving lens, and
        a light receiving element disposed a first predetermined distance from said light receiving lens along an optical axis of said light receiving optical system, the optical axis of said light projection system and the optical axis of said light receiving optical system positioned a second predetermined distance from each other, said light receiving element producing an output for determining the range by indicating deviation of the reflected light flux from the optical axis of said light receiving optical system.

2. A range detection optical system according to claim 1, wherein the light flux emitted from said light emission source through first regions of said light projection lens distant from the optical axis of said light projection system becomes focused at a position on the optical axis of said light projection system further away from said light projection lens than the light flux passing through second regions of said light projection lens closer to the optical axis of said light projection system.

3. A range detection optical system according to claim 1, wherein the following condition is satisfied:
0.85=(f1−Bf1')/(F1−Bf1)=1.0
where Bf1 is a distance along the optical axis of said light projection system between the surface of said light projection lens closest to said light emission source and the focal point of said light projection lens, Bf1' is a distance along the optical axis of said light projection system between the surface of said light projection lens closest to said light emission source and said light emission source, and f1 is a focal length of said light projection lens towards said light emission source.

4. A range detection optical system according to claim 3, wherein the following condition is satisfied:
0.1<(R2T−R1T)/R1T<1.5
where h1 is a maximum effective diameter of a surface of said light projection lens closest to the object, R1T is a distance along the optical axis of said light projection system between a position of an image of said light emission source through a paraxial region of said light projection lens and the surface of said light projection lens closest to the object, and R2T is a distance along the optical axis of said light projection system between a position where the light flux passing at a height of h½ from the optical axis of said light projection system on the surface of said light projection lens closest to the object is focused and the surface of said light projection lens closest to the object.

5. A range detection optical system according to claim 1, wherein a focal point of said light receiving lens is located between said light receiving element and a surface of said light receiving lens closest to said light receiving element.

6. A range detection optical system according to claim 5, wherein the further from the optical axis of said light receiving optical system the reflected light flux focuses on said light receiving element, the further the object from said light receiving lens.

7. A range detection optical system according to claim 5, wherein the following condition is satisfied:
0.85<(f2−Bf2')/(f2−Bf2)<1.0
where Bf2 is a distance along the optical axis of said light receiving optical system between the surface of said light receiving lens closest to said light receiving element and the focal point of said light receiving lens, Bf2' is a distance along the optical axis of said light receiving optical system between the surface of said light receiving lens closest to said light receiving element and said light receiving element, and f2 is a focal length of said light receiving lens towards said light receiving element.

8. A range detection optical system according to claim 7, wherein the following condition is satisfied:

$$0.1 < (R2J-R1J)/R1J < 1.5$$

where h2 is a maximum effective diameter of the surface of said light receiving lens closest to the object, R1J is a distance along the optical axis of said light receiving optical system between a position of an image of said light receiving element through a paraxial region of said light receiving lens and the surface of said light receiving lens closest to the object, and R2J is a distance along the optical axis of said light receiving optical system between a position where the reflected light flux passing at a height of h⅔ from the optical axis of said light receiving optical system on the surface of said light receiving lens closest to the object is focused on said light receiving element and the surface of said light projection lens closest to the object.

9. A range detection optical system, for detecting a range to an object from said range detection optical system, comprising:
  a light projection system for projecting light flux onto the object, including
    a light emission source emitting the light flux, and
    a light projection lens disposed to receive the light flux from the light emission source and direct the light flux along an optical axis of said light projection system and onto the object, and
  a light receiving optical system for condensing reflected light flux from the object and measuring the range to the object from said range detection optical system, including
    a light receiving lens, and
    a light receiving element disposed a first predetermined distance from said light receiving lens along an optical axis of said light receiving optical system and generating an output signal indicative of the range, the optical axis of said light projection system and the optical axis of said light receiving optical system positioned a second predetermined distance from each other, and said light receiving lens having a focal point always located between said light receiving element and a surface of said light receiving lens closest to said light receiving element.

10. A range detection optical system according to claim 9, wherein the reflected light flux focused on said light receiving element, after passing through first regions of said light receiving lens, distant from the optical axis of said light receiving optical system is reflected from a position on the optical axis of said light projection system further away from said light receiving lens than the reflected light flux passing through second regions of said light receiving lens closer to the optical axis of said light receiving optical system.

11. A range detection optical system according to claim 9, wherein the following condition is satisfied:
$$0.85 < (f2-Bf2')/(f2-Bf2) < 1.0$$
where Bf2 is a distance along the optical axis of said light receiving optical system between the surface of said light receiving lens closest to the light receiving element and the focal point of said light receiving lens, Bf2' is a distance along the optical axis of said light receiving optical system between the surface of said light receiving lens closest to the light receiving element and said light receiving element, and f2 is a focal length of said light receiving lens towards said light receiving element.

12. A range detection optical system according to claim 11, wherein the following condition is satisfied:

$$0.1 < (R2J-R1J)/R1J < 1.5$$

where h2 is a maximum effective diameter of a surface of said light receiving lens closest to the object, R1J is a distance along the optical axis of said light receiving optical system between a position of an image of said light receiving element through a paraxial region of said light receiving lens and the surface of said light receiving lens closest to the object, and R2J is a distance along the optical axis of said light receiving optical system between a position where the reflected light flux passing at a height of h⅔ from the optical axis of said light receiving optical system on the surface of said light receiving lens closest to the object is focused on said light receiving element and the surface of said light projection lens closest to the object.

* * * * *

UNITED STATES PATENT AND TRADEMARK OFFICE
CERTIFICATE OF CORRECTION

PATENT NO. : 5,496,994
DATED : March 5, 1996
INVENTOR(S) : Motoyuki Ohtake

It is certified that error appears in the above-indentified patent and that said Letters Patent is hereby corrected as shown below:

TITLE PAGE [56] References Cited line 4, "3,489,495  3/1969" should be

--3,489,495   1/1970--.

Signed and Sealed this

Thirtieth Day of July, 1996

Attest:

BRUCE LEHMAN

*Attesting Officer*   Commissioner of Patents and Trademarks